United States Patent Office 3,296,271
Patented Jan. 3, 1967

3,296,271
BIS-[4-FORMYL-5-HYDROXY-6-METHYL-PYRIDYL (3)METHYL] DISULFIDE
Gustav Schorre, Darmstadt-Eberstadt, Germany, assignor to E. Merck Aktiengesellschaft, Darmstadt, Germany
No Drawing. Filed Dec. 26, 1963, Ser. No. 333,725
Claims priority, application Germany, Jan. 12, 1963, M 55,402
2 Claims. (Cl. 260—294.8)

This invention relates to a sulfur containing vitamin $B_6$ derivative, in particular to bis-[4-formyl-5-hydroxy-6-methyl-pyridyl-(3)-methyl]-disulfide conforming to the structure of Formula I, as follows:

FORMULA I

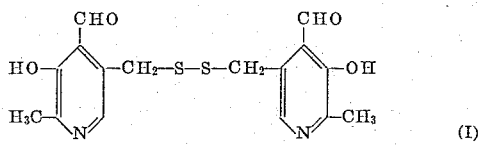

(I)

A principal object of this invention, therefore, is to provide the novel compound conforming to Formula I.

Another object is to provide processes for the production of this novel compound as well as novel intermediates therefor.

Additional objects are to provide pharmaceutical compositions and methods of administration based on the novel compound of this invention.

Upon further study of the specification and claims other objects and advantages of the present invention will become apparent.

To attain the objects of this invention, various processes are provided for producing the pyridoxalyl-disulfide of Formula I. According to each process, different starting compounds are required as defined by Formulae II, III, IV and V.

FORMULA II

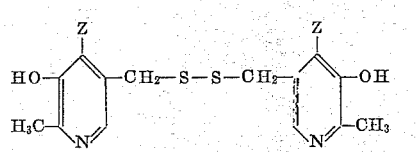

(II)

With the above starting compound wherein Z is a functional derivative of an aldehyde group, the compound of Formula I is obtained by liberating the aldehyde group by conventional techniques.

FORMULA III

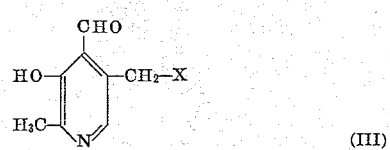

(III)

Using the above compound wherein X is a halogen, preferably Cl or Br, a reaction is conducted with an inorganic disulfide, preferably an alkali metal disulfide such as sodium disulfide, in order to produce the pyridoxalyl disulfide.

FORMULA IV

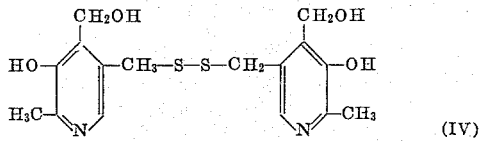

(IV)

To produce the desired product, the above compound is oxidized at the 4-position in both rings to produce the 4-formyl substituent. This oxidation is accomplished, for example, by the employment of manganese dioxide.

FORMULA V

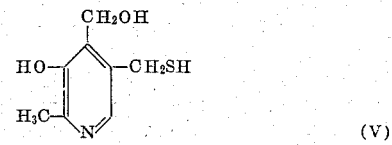

(V)

The above compound is oxidized in the same manner as the compound set forth in Formula IV. In addition to the 4-formyl production, the mercapto compound is converted into the disulfide.

The preceding processes will now be described with greater particularity.

In the pyridoxalyl-disulfide of Formula II, Z represents a functional derivative of an aldehyde group from which the unaltered aldehyde group can be liberated by known methods. Such a functional derivative of an aldehyde group can for example appear as an acetal, oxazolidine, oxime, semicarbazone, hydrazone, or bisulfite group, the latter group being possibly joined to the nitrogen of the pyridine ring by a betaine-like bond. The aldehyde groups can also be in the form of a substituted hydrazone group, preferably phenyl hydrazone- or dinitrophenylhydrazone groups, or can be in the form of such hydrazone groups as would be produced by the treatment of aldehydes with a Girard reagent. The aldehyde group can also be protected in the form of a Schiff base. If Z is an acetal group, preferred starting materials would be those acetals in which Z represents $$R_1-O-CH-OR_2$$

Here $R_1$ and $R_2$ are lower alkyl groups which can be like or unlike, or can be connected with each other. If Z represents an oxazolidine group, it can carry alkyl, aralkyl and/or aryl groups as substituents on the nitrogen as well as on the carbon atoms.

The aldehyde group can be set free by conventional methods which are described in Houben-Weyl "Methgroup from an acetal group, it can be done by treatment with dilute acids. Dilute sulfuric, succinic, tartaric, citric, and especially dilute hydrochloric acid is generally used. Use can be made of any of the reaction conditions and methods which are described in Houben-Weyl's "Methoden der organischen Chemie," 4th Edition, published by Georg Thieme, Stuttgart, 1954, Vol. 7, part 1, pages 423–428.

The liberation of the aldehyde group from an oxazolidine group is done in a manner similar to the splitting of acetals. The use of dilute hydrochloric acid as a hydrolyzing agent has been found to be especially advantageous.

The liberation of an aldehyde group from possibly substituted hydrazone or oxime group is also done by generally known methods such as are described in Houben Weyl (supra) on pages 474–478.

The hydrazones and oximes can be split by dilute oxalic, phthalic, hydrochloric or sulfuric acid. The cleavage can also be accomplished by liberating the carbonyl group, and therefore in this case the pyridoxalyl disulfide, by the addition of a reactive aldehyde, e.g. 2,4-dinitrobenzaldehyde. The oxime is preferably split in the presence of an oxidizing agent. The splitting can also be accomplished by treatment with dilute hydrochloric acid in the presence of an equivalent amount of formaldehyde.

If an aldehyde groups in the compound of Formula II are present as aldehyde-hydrogen-sulfite adducts ("bisulfite-adducts"), then the aldehyde groups can be set free by the known methods described in Houben Weyl (supra) on pages 484–485. The splitting is preferably done with dilute acids in the presence of an equivalent amount of a carbonyl component which has a strong affinity for the hydrogen sulfite, as for example formaldehyde.

As has already been stated, the aldehyde groups can also occur as Schiff bases. The splitting of such Schiff bases with the liberation of the desired pyridoxalyl-disulfide of Formula I can be accomplished e.g. by brief warming with dilute mineral acids by known methods. (See Houben Weyl (supra) p. 458.)

It is also possible to perform the acid hydrolysis of a compound of Formula II by the use of an acid ion exchanger. Strongly acidic ion exchangers which contain sulfonic acid or carboxyl groups should be used for this purpose, as for example those sold under the trademark "Amberlite IR 120." For performing the hydrolysis with an acid ion exchanger, the compound of Formula II, e.g. pyridoxalyl-disulfide-tetraalkyl-acetal is allowed to stand overnight in aqueous solution with an equivalent amount of an ion exchanger, preferably with agitation. On the following morning, the ion exchange resin can be separated and treated wtih sodium hydroxide solution. The eluate is extracted in the usual manner with an organic solvent such as ethyl acetate. From the extract the pyridoxalyl-disulfide can be obtained.

It is advantageous, for liberating the aldehyde group, to perform these reactions in an aqueous medium. For the production of high yields of the disulfide, it is also advisable to keep the reaction conditions as mild as possible. Reaction temperatures should preferably not exceed 60° C., the reaction times should be less than 3 hours, and the pH value of the reaction mixture should not be below 2.

Under more severe conditions increased amounts of the 7-hydroxy-6-methyl-thieno-[3,4-c]-pyridine of the formula

FORMULA VI

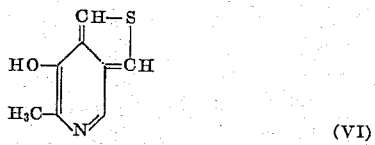

would be formed. This compound would also be produced if a pyridoxalyl-disulfide of Formula I, produced either by the method of this invention or by some other method, is subjected to a more severe acid hydrolysis. It can also be assumed that during an acid hydrolysis of the compound of Formula II, the 7-hydroxy-6-methyl-thieno-[3,4-c]-pyridine will be formed from the initially produced pyridoxalyl-disulfide (I) as a by-product or under more severe conditions such as longer reaction time, stronger acid or higher reaction temperature. This pyridine derivative of Formula VI can be used as an accelerator in the vulcanization of rubber and as cross-linking agent in polymerization reactions.

It has been found especially advantageous to begin with a compound of Formula II wherein Z represents a dialkylacetal group. The hydrolysis is then preferably performed with a 1-n aqueous hydrochloric acid solution. As a reaction temperature, the 40–50° C. range is best. Under these conditions, the hydrolysis is generally completed after 15 minutes.

The necessary starting materials of Formula II are obtainable e.g. by reacting a 2-methyl-3-hydroxy-4Z-5X-methyl-pyridine (Z and X have the meanings given above) with an alkali disulfide. The pyridoxine disulfide can be produced by that method described in German Patent 1,135,460.

By the method of this invention it is also possible to produce the pyridoxalyl-disulfide of Formula I by treatment of a 2-methyl-3-hydroxy-4-formyl-5X-methyl pyridine (III) with an inorganic disulfide where X has the previously indicating meaning. The inorganic disulfide is preferably an alkali metal disulfide such as $Na_2S_2$. The treatment of a compound of Formula III with an inorganic disulfide, e.g. sodium disulfide, is preferably performed in an inert organic solvent, e.g. in the presence of a lower aliphatic alcohol such as methanol or ethanol, or in the presence of dimethyl-formamide or tetrahydrofuran. The reaction conditions here should also be mild, e.g. the reaction should preferably be performed at temperatures between 0 and 50° C. and will generally be completed after about half an hour. The disulfide is preferably suspended in a solvent to which a compound of Formula III is slowly added drop-by-drop. In this reaction an excess of the disulfide should preferably be avoided, as undesirable by-products would be formed.

The pyridoxalyl-disulfide of Formula I can also be produced by oxidation of the pyridoxolyl-disulfide of Formula IV with manganese dioxide. The oxidation is preferably performed in an aqueous acid solution of sulfuric acid. The work is preferably done at temperatures between 40 and 60° C. and the reaction time is usually about 2 hours. The starting material can also be 2-methyl-3-hydroxy-4-hydroxymethyl-5-mercaptomethyl-pyridin, which upon oxidation is converted into a pyridoxalyl-disulfide. It will be necessary to isolate the pyridoxalyl-disulfide.

The pyridoxalyl-disulfide of Formula I has important pharmacological properties. Besides its analgesic action it also exerts anticonvulsive effects during metabolic disturbances in the brain, its effect being similar to that of vitamin $B_6$. It also has a tranquilizing and sensitizing effect on 5-hydroxy-tryptamin. The substance also exerts central simulating and emetic effects. On the basis of these pharmacological tests the substance appears to be suitable for the treatment of cerebral functional disturbances of the kind that have been found to require vitamin $B_6$ therapy, as for counteracting a vegetative dystrophy and also for the elimination of anxiety and depression. As compared with the known pyridoxine disulfide, the pyridoxalyl-disulfide is more effective.

The pyridoxalyl disulfide of Formula I can be converted in to pharmaceutically useful forms. For this purpose the usual medicinal carriers can be used which are suitable for parenteral, enteral or topical application. Among them are water, vegetable oils, lactose, starch, magnesium stearate, talc, etc. The new compounds can be used in the form of tablets, dragess or injection solutions. In its pharmaceutical compostion pyridoxalyl-disulfide is preferably used in dosages of 1 to 200 mg. in unit dosage form. In any event, an effective dosage is always administered for the therapeutic purposes.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example 1*

A solution of 26 g. 3-chloromethyl-4-diethoxymethyl-5-hydroxy-6-methyl-pyridine in 150 ml. absolute alcohol is added drop-by-drop to a suspension of 6 g. sodium disulfide in 50 ml. absolute alcohol at 10–15° C., during 20 minutes with stiring and cooling with ice water. After being stirred half an hour at room temperature, the solution is warmed 15 minutes to 40–50° C., and is then poured into 800 ml. water. The separated oil is taken up with ether, dried, and evaporated down. The residue from the ether, a yellow oil which consists mainly of pyridoxalyl-disulfide tetraethylacetal, is dissolved in 80 ml. 1–$n$ hydrochloric acid and is warmed 20 minutes to 40° C. The acid solution is then cooled with ice, brought to pH 7 with sodium bicarbonate, is extracted with ethyl acetate, washed with water, and dried over sodium sulfate. During concentration under vacuum, the pyridoxalyldisulfide separates in pure form as yellow crystals. M.P. 124–125° C. (red liquid). Yield 12.2 g. Dioximederivative—M.P. 300° C.

If the acid treatment is under more severe conditions, e.g. at temperatures from 80 to 100° C., the product will be 7-hydroxy-6-methyl-thieno-[3,4-c]-pyridine melting at 272° C. with decomposition, in a yield of about 50–60% of the thoretical.

Example 2

5 g. of the pyridoxalyl-disulfide tetraethylacetate obtained in Example 1 are warmed half an hour at 40–45° C. in 50 ml. 50% citric acid solution. The solution is then brought to pH 7 with sodium bicarbonate solution and is extracted with ethyl acetate, dried over sodium sulfate, and concentrated under reduced pressure. Yield 2 g. pyridoxalyl-disulfide, M.P. 123–124° C.

Example 3

2 g. pyridoxalyl-disulfide tetraethylacetate in admixture with 40 ml. of dioxane and 20 ml. water are agitated over night in the presence of 10 g. of a strongly acid ion exchange resin, e.g. "IR 120." The ion exchange resin is filtered off under suction and the pyridoxalyl-disulfide clinging thereto is eluted with 15 ml. 1-$n$ NaOH. The solution is brought to pH 7, extracted with ethyl acetate, dried and concentrated. Yield 0.9 g. pyridoxalyl-disulfide. M.P. 123–124° C.

Example 4

1 g. bis-4-[(3',4'-dimethyl-5'-phenyl-oxazolidinyl-2'-)-5-hydroxy-6-methyl-pyridyl-(3)-methyl] disulfide (M.P. 178° C.) are warmed 30 minutes at 50° C. in admixture with 10 ml. 2-$n$-hydrochloric acid and the pH value brought to 7 with sodium bicarbonate. The solution is then extracted with ether, dried, and the ether evaporated. Yield 0.4 g. pyridoxalyl-disulfide. M.P. 123–124° C.

Example 5

1 g. pyridoxalyl-disulfide dioxime is suspended in 10 ml. 35% formaldehyde solution and after an addition of 5 ml. 1-$n$ hydrochloric acid and 5 drops 2-$n$ HCl acid, is warmed one hour at 70° C. After cooling the pH is brought to 7 with sodium bicarbonate solution, extracted with ethyl acetate and concentrated. Yield 0.3 g. pyridoxalyl-disulfide. M.P. 123–124° C.

Example 6

6 g. pyridoxalyl-disulfide dibetaine sulfonic acid (M.P. 158–160° C. with decomposition) are warmed one-half hour at 70° C. in admixture with an equivalent amount of formaldehyde (0.695 g.=1.7 ml. 40% aqueous formaldehyde solution). The solution is then treated with sodium bicarbonate solution, extracted with ethyl acetate and concentrated. Yield 1.5 g. pyridoxalyl-disulfide, M.P. 123–124° C.

Example 7

1.5 g. pyridoxalyl-disulfide diphenyl hydrazone are agitated 4 hours at room temperature in admixture with 30 ml. 2-$n$ HCl acid and 1.5 g. 2,4-dinitrobenzaldehyde. The precipitated 2,4-dinitrobenzaldehyde phenylhydrazone is filtered with suction and the pH of the filtrate brought to 7. The product is extracted with ethyl acetate, dried over sodium sulfate, and evaporated down. Yield 0.3 g. pyridoxalyl-disulfide, M.P. 123–124° C.

Example 8

10 g. pyridoxalyl-disulfide are dissolved in dilute sulfuric acid (10 g. $H_2SO_4$ in 100 ml. water) and warmed 2 hours at 60° C. with manganese dioxide under continual stirring. The $MnO_2$ which has not gone into solution is filtered off, the pH of the filtrate brought to 7, extracted with ethyl acetate, dried over sodium sulfate, and evaporated down. Yield 2 g. pyridoxalyl-disulfide, M.P. 123–124° C.

Example 9

10 g. 2-methyl-3-hydroxy-4-formyl-5-chloromethylpyridine are dissolved in 30 ml. dimethylformamide and the solution added slowly drop-by-drop at room temperature to a suspension of 3.3 g. $Na_2S_2$ in 20 ml. dimethyl formamide. The reaction mixture is then warmed 5 minutes to 40° C. and after cooling to room temperature is diluted with 250 ml. water. The separated oil is taken up with ethyl acetate, dried over sodium sulfate, filtered and evaporated down. Yield 1.7 g., M.P. 123–124° C.

The starting material may be obtained from pyridoxal-oxazolidine (cf. British Patent No. 880,595) which is chlorinated with thionyl chloride in chloroform according to conventional techniques. The obtained hydrochloride is heated in admixture with 2-$n$. HCl for 10 minutes to 80–90° C. When the reaction mixture is adjusted to pH 5 by the addition of sodium bicarbonate an oil separates which may be purified or converted into the hydrochloride which decomposes with blackening at temperatures >200°.

Examples for pharmaceutical preparations—

(I) Tablets—One tablet contains:  Mg.
  Pyridoxalyldisulfide _____ 100
  Lactose _____ 250
  Potato starch _____ 120
  Talc _____ 40
  Magnesium stearate _____ 5

(II) Coated tablets—One tablet
  contains in the kernel:  Mg.
  Pyridoxalyldisulfide _____ 150
  Lactose _____ 150
  Corn starch _____ 50

The pressed kernel is coated with sugar syrup according to standard procedures to make up 500 mg./coated tablet.

The pyridoxalyl-disulfide was tested according to the method described by Irwin et al. in Arch. Int. Pharmacodyn., vol. 118, page 358 (1959). In this CNS-screening test, a dose of 300 mg./kg. administered orally was found to be effective in mice whereas a dose of 3 g./kg. of the known pyridoxolyl-disulfide was required to cause the same effect. Thus, in pharmacological tests the new compound has about tenfold the effectiveness of pyridoxolyl-disulfide. Qualitatively, the effects of pyridoxalyl-disulfide equal that of pyridoxolyldisulfide.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A compound of the formula

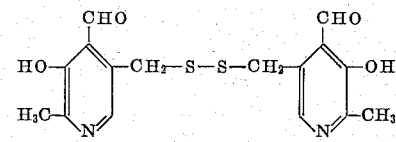

2. A compound of the formula

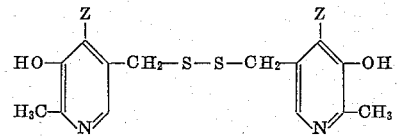

wherein Z is a functional derivative of the aldehyde group.

(References on following page)

References Cited by the Examiner

UNITED STATES PATENTS

| | | | |
|---|---|---|---|
| 2,510,893 | 6/1950 | Kleiman | 260—294.8 |
| 2,510,894 | 6/1950 | Kleiman | 260—294.8 |
| 2,543,544 | 2/1951 | Campaigne et al. | 260—294.8 |
| 2,581,869 | 1/1952 | Kyrides | 260—294.8 |
| 3,008,963 | 11/1961 | Mathes et al. | 260—297 |
| 3,010,966 | 11/1961 | Zima et al. | 260—294.8 |
| 3,067,205 | 12/1962 | Callighan et al. | 260—297 |
| 3,090,726 | 5/1963 | Berger | 167—65 |
| 3,178,347 | 4/1965 | Bocher | 167—65 |

WALTER A. MODANCE, *Primary Examiner.*

A. L. ROTMAN, *Assistant Examiner.*